(12) United States Patent
Mehio et al.

(10) Patent No.: US 8,615,229 B2
(45) Date of Patent: Dec. 24, 2013

(54) MOBILE UNIT AND NETWORK ELEMENT FOR TESTING RF COVERAGE

(75) Inventors: Mohamad M. Mehio, Naperville, IL (US); Hemi P. Trickey, Naperville, IL (US); Ronald M. Dsouza, Mumbai (IN); George P. Wilkin, Bolingbrook, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/077,486

(22) Filed: Mar. 31, 2011

(65) Prior Publication Data

US 2012/0252438 A1 Oct. 4, 2012

(51) Int. Cl.
*H04W 24/00* (2009.01)

(52) U.S. Cl.
USPC .......................................................... 455/423

(58) Field of Classification Search
USPC ............... 455/425, 404.2, 403, 456.2, 452.1, 455/562.1, 456.3, 418, 518, 441, 446; 342/357.64, 367
See application file for complete search history.

(56) References Cited

U.S. PATENT DOCUMENTS

| 2004/0121784 A1* | 6/2004 | Park et al. | 455/456.1 |
| 2008/0102825 A1* | 5/2008 | Joo | 455/432.1 |
| 2009/0143078 A1* | 6/2009 | Tu et al. | 455/456.3 |
| 2010/0099377 A1* | 4/2010 | Jeong | 455/404.2 |

\* cited by examiner

*Primary Examiner* — Kiet Doan
(74) *Attorney, Agent, or Firm* — J. B. MacIntyre

(57) ABSTRACT

A mobile unit and network element are used to test RF coverage in a wireless communication network. A mobile unit receives testing location information, including the cell location data and the boundary information, from a network element. The mobile unit moves about the testing location and receives information about the RF quality of the signal and stores this data. The mobile unit periodically sends the stored data to the network element. The network element includes a correlation element that correlates the received data to form new values for each of the cell sites tested. This correlated value can be used for multiple cell sites to determine which cell sites most need additional RF coverage testing. In addition, the network element can map the data and either send to the mobile unit, display on a monitor at the network element, or sent to a web server for access via the Internet.

7 Claims, 4 Drawing Sheets

MOBILE UNIT AND NETWORK ELEMENT FOR TESTING RF COVERAGE

FIELD OF THE INVENTION

The present invention relates generally to communication systems, and more particularly to testing RF coverage in a communication system.

BACKGROUND OF THE INVENTION

Determining the RF coverage in a cellular system is very important. There is currently no way of receiving data on the quality of RF coverage without utilizing dedicated test devices.

Therefore, a need exists for a way of determining RF coverage in a cellular communication system without utilizing dedicated testing devices.

BRIEF SUMMARY OF THE INVENTION

A mobile unit and a network element perform RF coverage testing in a wireless network. The mobile unit receives testing location information that includes a geographic area and may also include cell location data, boundary information for a cell site, or mapped information. The testing location information can alternately include a test path for the mobile unit to travel to complete the RF coverage testing. A timer is started in the mobile unit.

The mobile unit then moves about the wireless network, either as usual or in order to test the RF coverage of the wireless network. The mobile unit receives signals form one or more base stations. Each signal has an associated RF quality, such as location information, a time stamp, signal strength, or latitude and longitude. The mobile unit preferably receives the signals at predetermined time intervals.

The mobile unit stores the RF quality information, along with other information pertaining to the signal received.

Upon expiration of the timer, the mobile unit transmits the stored information to the network element.

The network element includes a correlation element that correlates the information received from the mobile unit. This is preferably accomplished by comparing measured data locations with received data for each cell and combining them to form new correlated values.

The network element can determine correlated values for any cell sites within the wireless network. The network element can compare these values to determine which among a plurality of cell sites should be tested next.

The network element can plot the testing location on a map. This visually shows which areas have strong RF coverage and can graphically help show which cell sites should be tested soon. The map can also be sent to the mobile unit, which can help a user of the mobile unit determine where to travel next to perform testing. The map can be displayed at the network element or sent to a website.

DETAILED DESCRIPTION OF THE INVENTION

Figure 1A:
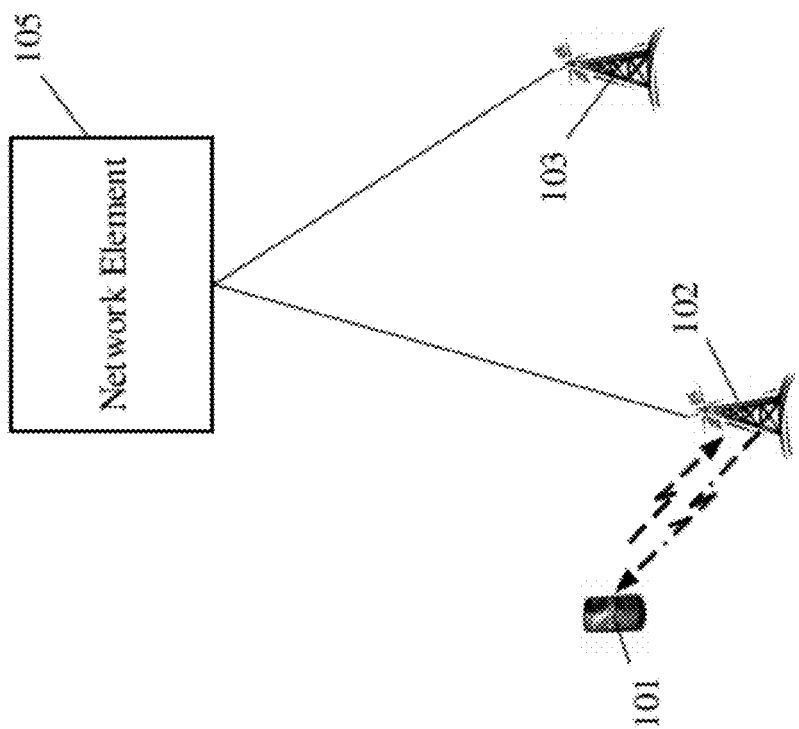
FIGS. 1a and 1b depict a wireless network including a multi-use mobile unit testing device in a first position and a second position in accordance with an exemplary embodiment of the present invention.
Figure 1B:
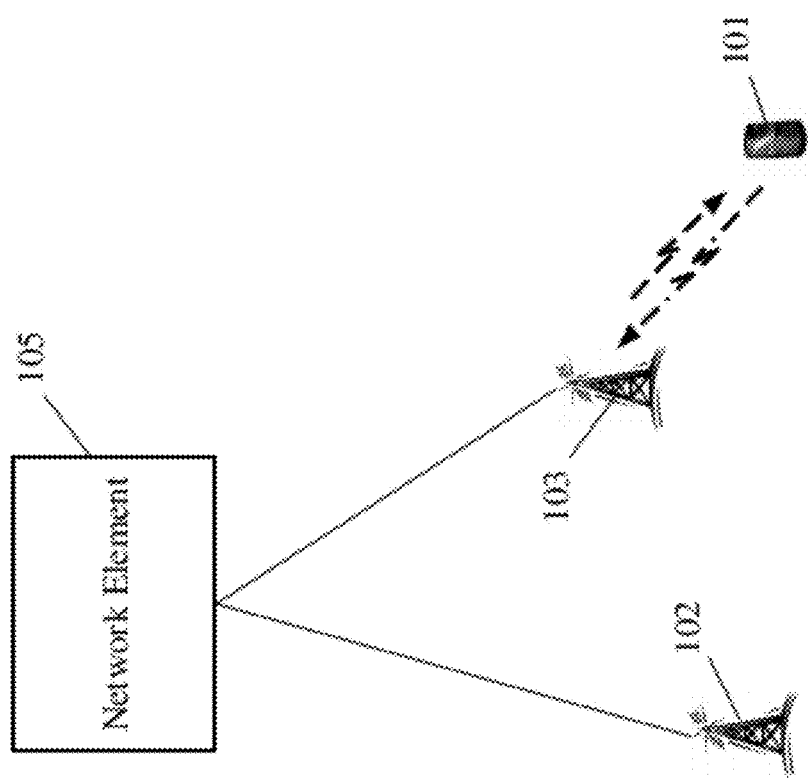
Figure 2:
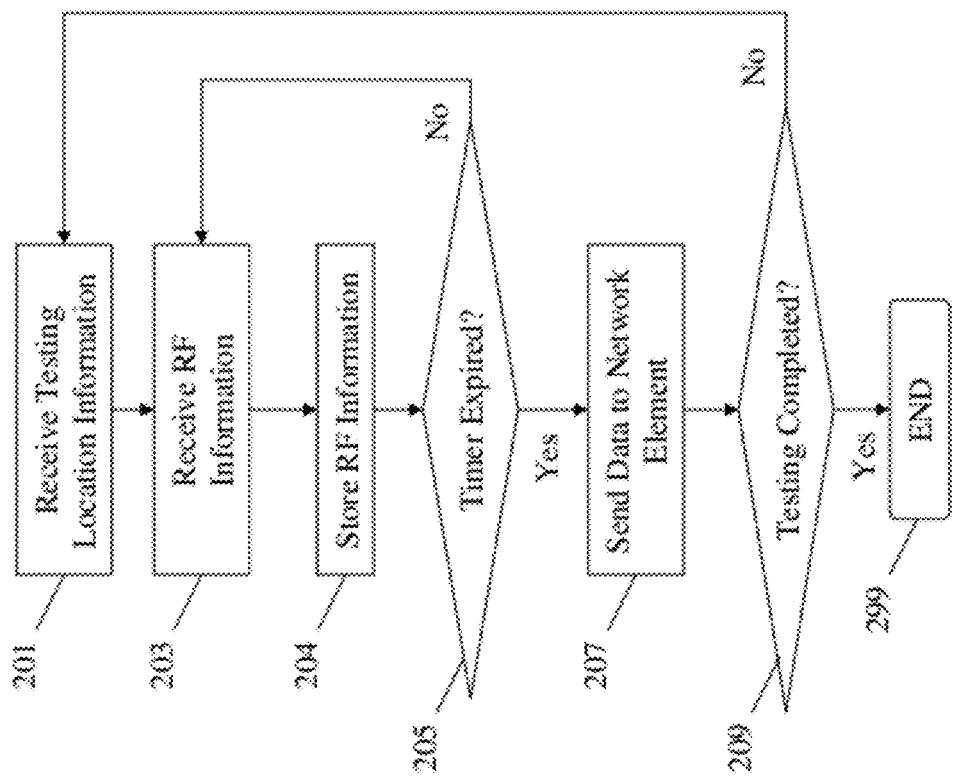
FIG. 2 depicts a flowchart for a mobile unit in accordance with an exemplary embodiment of the present invention.
Figure 3:
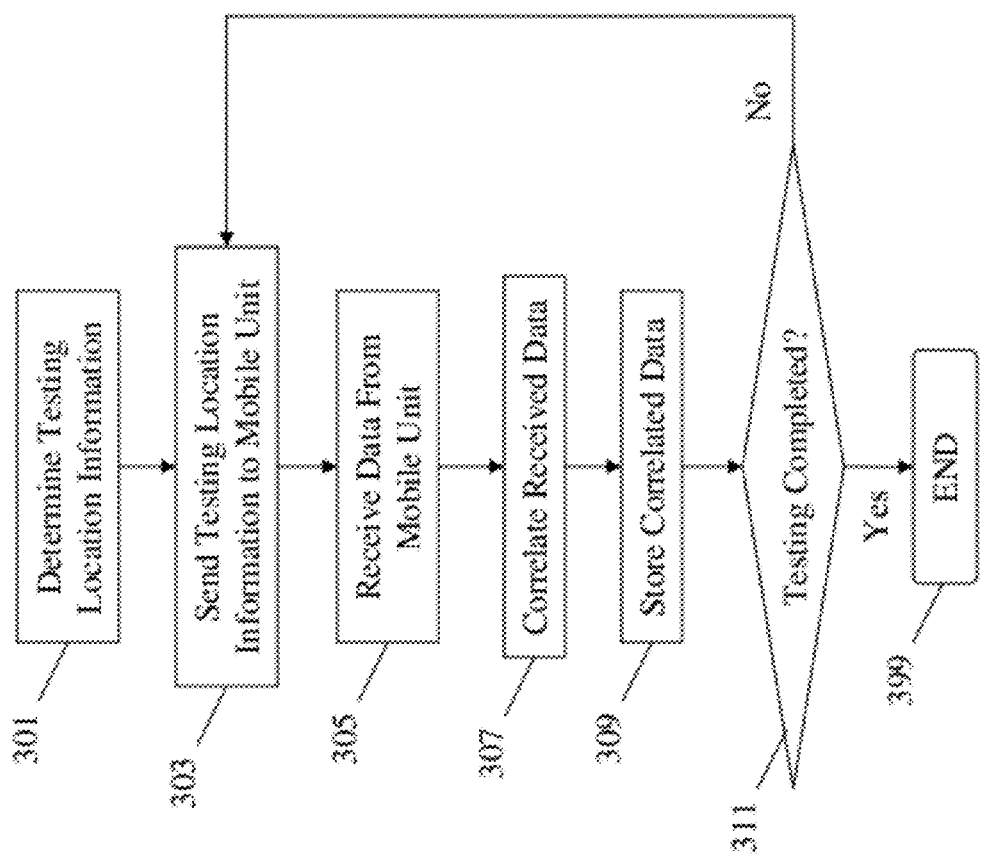
FIG. 3 depicts a flowchart for a network element in accordance with an exemplary embodiment of the present invention.

An exemplary embodiment of the present invention can be better understood with reference to FIGS. 1 through 3. FIGS. 1a and 1b depict a wireless network 100 including a multi-use mobile unit testing device 101 in accordance with an exemplary embodiment of the present invention. In accordance with an exemplary embodiment, wireless network 100 comprises base stations 102 and 103 and network element 105. It should be understood that wireless network 100 also includes other devices that allow network 100 to process wireless communications. Wireless network 100 communicates with mobile unit testing device 101 via any of a plurality of air interfaces.

An exemplary embodiment of the present invention comprises a mobile unit testing device 101, such as a "smartphone", and a network element that provides correlation functions.

Base stations 102 and 103 are cellular base stations and communicate over the air with mobile unit 101. Base stations 102 and 103 each cover a predetermined area commonly known as a cell site. It should be understood that only two base stations are depicted for clarity, but a typical wireless network includes a plurality of base stations.

Network element 105 preferably includes a correlation element. The correlation element processes measurement data received from mobile unit testing device 101. The correlation element plots each data point at its corresponding GPS coordinates on a map, preferably with a predetermined color code. In an exemplary embodiment, the actual locations of the cell sites around the drive route area are also overlaid on the map to allow a user of mobile unit testing device 101 to identify problematic cell sites for further analysis.

In accordance with an exemplary embodiment, the correlation element is hosted as an internet present web service. The correlation element is preferably capable of accepting, processing, and storing data received from multiple moving mobile units at the same time. This can be done automatically as the data is received during ongoing field tests.

FIG. 2 depicts a flowchart 200 for a mobile unit in accordance with an exemplary embodiment of the present invention. It should be understood that a plurality of mobile units communicate with wireless network 100 at any given time, and that any or all of these mobile units can be utilizing the present invention.

Mobile unit 101 receives (201) testing location information from network element 105. In an exemplary embodiment, the testing location information is downloaded by mobile unit 101 on startup of mobile unit 101. The testing location information preferably includes the cell location data and the boundary information for the test.

Mobile unit 101 may request testing location information from network element 105. This request could include a given time period that the data was collected and the numbers of days in the past that mobile unit 101 would like the data for.

In an exemplary embodiment, the testing location information received by mobile unit 101 comprises a map of the area to be tested. In an alternate exemplary embodiment, the testing location information comprises a display of the percentage of testing that has been completed and is presented in a form decipherable by a user of mobile unit 101, such as a map.

In an exemplary embodiment, the testing location information is a test path that shows mobile unit 101 where it should travel in order to complete the desired testing. For example, a route can be sent to mobile unit 101 to instruct mobile unit 101 on the path to travel. Alternately, a series of driving or other travel instructions can be sent to mobile unit 101, which instructions would provide driving or other instructions for a user of mobile unit 101. These instructions would preferably be in the form of driving instructions that instruct a user of mobile unit 101 on which direction to travel while moving in the vehicle. For example, instructions can be given that instruct a user of mobile unit 101 to turn right at the next street or to continue driving straight, etc.

In the situation where there are a plurality of mobile units performing the RF testing, and therefore covering a large portion of the coverage area that is desired to be tested, no route could be given and the number of mobile units collecting data could be sufficient to provide for adequate testing.

In accordance with an exemplary embodiment, mobile unit 101 sets a timer upon receiving the testing location information. This timer us utilized to inform mobile unit 101 when it should send collected test RF information to network element 105. In an exemplary embodiment, the timer is set to five minutes, but alternate times can be set for this timer.

Mobile unit 101 moves about the testing location and receives (203) information about the RF quality of the signal. Mobile unit 101 can be driven through the test area or can alternately by carried while walking, riding public transportation, riding a bicycle or motorcycle, or via any other effective means of traveling through the test area.

In accordance with an exemplary embodiment, mobile unit 101 collects information at a pre-set time interval, such as a second or a fraction of a second. In accordance with and exemplary embodiment, the information about the RF quality of the signal comprises location information, a time stamp, the signal strength (−dBm), and the attached cell site. The location information can be, for example, the latitude and longitude, and preferably comprises standard LBS/GPS coordinates. The GPS coordinates of the cell site can be correlated on the smart phone or as a part of post collection analysis of the information.

Mobile unit 101 stores (204) the information, preferably in memory located within mobile unit 101.

Mobile unit 101 determines (205) if a timer has expired. If the timer has not expired, mobile unit 101 returns to step 203 and continues to receive RF information.

If the timer has expired as determined at step 205, mobile unit 101 sends (207) the stored data to network element 105. Mobile unit 101 preferably sends the stored data to network element 105 via any allowed standard data transfer method, including as examples over-the-air transmission such as cellular, Wi-Fi, or other transmission method supported by the device. Multiple mobile units can be utilized to send similar data to network element 105.

Mobile unit 101 determines (209) if the testing is completed. In an exemplary embodiment, mobile unit 101 makes this determination based upon information received from network element 105. If the testing is complete, the process ends (299).

If the testing is not completed, mobile unit 101 preferably returns to step 201 to receive new testing location information. In an exemplary embodiment, mobile unit will skip this step and rely on the testing location information received previously and continue to receive and store RF information based from its current location.

FIG. 3 depicts a flowchart 300 for a network element in accordance with an exemplary embodiment of the present invention.

Network element 105 determines (301) the testing location information to be used by mobile unit 101. Network element 105 preferably provides the parameters that mobile unit 101 uses when collecting data. In an exemplary embodiment, network element 105 determines the time interval at which mobile unit 101 should collect information. In an exemplary embodiment, the time interval is one second. In an exemplary embodiment, a system designer or the like provides boundary information to network element 105. The boundary information comprises the area that is to be tested. This information is preferably stored in a correlation database located within network element 105. In accordance with an exemplary embodiment, additional information, such as the latitude and longitude information for the base stations located within the testing area, is provided as well.

Network element 105 sends (303) the testing location information to mobile unit 101. In an exemplary embodiment, the testing location information is sent to mobile unit 101 via a base station.

Network element 105 receives (305) data from mobile unit 101. In an exemplary embodiment, network element 105 receives the data via a base station.

Network element 105 correlates (307) the received data, preferably at the correlation element located within network element 105. The correlation element stores the received data within network element 105. In accordance with an exemplary embodiment, the correlation element compares the measured data locations with the received data for each cell and combines them to form new values for each of the cell sites tested. In addition, the correlation element can assign values to each cell site measurement and sorts the cell sites on these values to determine which cell sites should be tested next.

The correlation element is also effective in performing analysis of the RF coverage in the communication network based on the received data during the testing. This is preferably accomplished using the initial testing location information and the received data from mobile unit 101. This new data is then used in determining which further RF testing needs to be done and also what data to use initially in that testing.

In an exemplary embodiment, the correlation element matches the recorded cell ID to an actual cell location and plots the information on a map. The recorded signal strength is preferably color-coded based on a pre-defined range, such as excellent, very good, good, average, low, very low and none). This color-coded map can be sent to mobile unit 101 or displayed on network element 105 or a display device connected to network element 105. Alternately, the color-coded map can be copied to a web server and displayable to users on the internet.

Network element 105 stores (309) the correlated data, preferably in memory located in network element 105.

Network element 105 determines (311) if the testing is complete. If so, the process ends (399). If the testing is not complete, the process returns to step 303 and network element 105 sends updated, correlated information to mobile unit 101.

An exemplary embodiment of the present invention therefore significantly improves RF coverage testing. Low and poor coverage areas are identified utilizing mobile units, such as smartphones, that are already being used in the communication network for other purposes. This allows analysts to decide on where to direct any additional in-depth testing of the communication network.

While this invention has been described in terms of certain examples thereof, it is not intended that it be limited to the above description, but rather only to the extent set forth in the claims that follow.

The invention claimed is:

1. A network element comprising:
a processor for determining testing location information and a time interval;
a correlation database coupled to the processor, wherein the correlation database stores the testing location information and the time interval;
a transmitter coupled to the processor, the transmitter effective in sending the testing location information to a mobile unit;
a receiver coupled to the processor and effective in receiving data from the mobile unit;
memory coupled to the processor and effective in storing the data;
a correlation element coupled to the processor, the correlation element effective in correlating the data;
wherein the correlation element correlates the data by comparing measured data locations with received data for each cell and combines them to form new correlated values; and
wherein the correlation element compares a first correlated value related to a first cell site to a second correlated value associated with a second cell site, and wherein the comparison determines which cell site should be tested next.

2. A network element in accordance with claim 1, wherein the processor is effective in determining if testing is not complete, and if the testing is not complete sending updated correlated testing location information.

3. A network element in accordance with claim 1, wherein the correlation element performs analysis of RF coverage based on the received data.

4. A network element in accordance with claim 3, wherein the correlation element utilizes initial testing location information and the received data.

5. A network element in accordance with claim 1, wherein the data includes a recorded cell ID, and wherein the correlation element correlates the recorded cell ID to a cell ID of an actual cell location.

6. A network element in accordance with claim 1, wherein the correlation element plots the testing location information on a map.

7. A network element in accordance with claim 6, wherein the map is sent via the transmitter to a mobile unit.

\* \* \* \* \*